US009599967B2

(12) United States Patent
Price et al.

(10) Patent No.: US 9,599,967 B2
(45) Date of Patent: Mar. 21, 2017

(54) DEFERRING APPOINTMENT ALARMS

(71) Applicant: International Business Machines Corporation, Armonk, NY (US)

(72) Inventors: Dana L. Price, Surf City, NC (US); Michael C. Thompson, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/809,474

(22) Filed: Jul. 27, 2015

(65) Prior Publication Data
US 2017/0031325 A1     Feb. 2, 2017

(51) Int. Cl.
G04G 21/02     (2010.01)
G04G 13/02     (2006.01)
H04W 4/02     (2009.01)

(52) U.S. Cl.
CPC ........... *G04G 13/021* (2013.01); *G04G 21/02* (2013.01); *H04W 4/027* (2013.01)

(58) Field of Classification Search
CPC ...... G04G 13/02; G04G 13/00; G04G 13/021; G04G 21/02; H04W 4/027
See application file for complete search history.

(56) References Cited

U.S. PATENT DOCUMENTS

| 6,838,994 B2 * | 1/2005 | Gutta | G08B 23/00 340/573.1 |
| 9,192,326 B2 * | 11/2015 | Kahn | G04G 13/026 |
| 9,319,843 B2 * | 4/2016 | Lerenc | H04W 4/027 |
| 2002/0099550 A1 | 7/2002 | Emerick, Jr. | |
| 2007/0229517 A1 | 10/2007 | May et al. | |
| 2009/0036148 A1 * | 2/2009 | Yach | G06Q 10/109 455/457 |
| 2011/0130958 A1 * | 6/2011 | Stahl | G01C 21/362 701/533 |
| 2012/0120773 A1 | 5/2012 | O'Toole | |
| 2013/0018284 A1 * | 1/2013 | Kahn | G04G 13/026 600/595 |
| 2014/0032895 A1 | 1/2014 | Moon et al. | |
| 2014/0198628 A1 | 7/2014 | Yang et al. | |
| 2014/0243021 A1 * | 8/2014 | Lerenc | H04W 4/027 455/456.3 |
| 2015/0049592 A1 | 2/2015 | Braswell | |

FOREIGN PATENT DOCUMENTS

CA          2843998 A1     9/2014

* cited by examiner

*Primary Examiner* — Sean Kayes
(74) *Attorney, Agent, or Firm* — James H. Mayfield

(57) ABSTRACT

A method, executed by a computer, for deferring an alarm includes determining a user's location relative to an appointment, calculating a required alert time, and setting a deferral duration to less than or equal to a difference between a required alert time and a current time. In some embodiments, a final alarm is activated when the deferral duration has elapsed. The alarm may be deactivated when the appointment occurs or when the user arrives at the appointment location. In some embodiments, the travel time to the appointment is calculated and the mode of transportation is determined. The required alert time may correspond to an amount of time the user requires to prepare for the appointment or for departure to the appointment. A computer program product and computer system corresponding to the above method are also disclosed herein.

17 Claims, 4 Drawing Sheets

DEFERRING APPOINTMENT ALARMS

BACKGROUND OF THE INVENTION

The present invention relates generally to appointment alarms, and more specifically, to delaying appointment alarms.

An appointment alarm is an alarm that is designed to make a sound or some other signal at a specific time. Common uses of these alarms includes awakening people from sleep and reminding individuals of appointments. Appointment alarms may use sound, light, and/or vibration. To stop the alarm, a hardware or software toggle may be activated. Many appointment alarms may automatically stop the alarm if left unattended long enough. Appointment alarms may be executed by mobile phones, watches, alarm clocks, clock radios, computers, laptops, tablets, calendar software, and the like.

SUMMARY

A method, executed by an electronic device, for deferring an alarm includes determining a user's location relative to an appointment, calculating a required alert time, and setting a deferral duration to be less than or equal to a difference between a required alert time and a current time. In some embodiments, a final alarm is activated when the deferral duration has elapsed. The alarm may be deactivated when the appointment occurs or when the user arrives at the appointment location. In some embodiments, the travel time to the appointment is calculated and the mode of transportation is determined. The required alert time may correspond to an amount of time the user may need to prepare for the appointment or for departure to the appointment. A computer program product and computer system corresponding to the above method are also disclosed herein.

DETAILED DESCRIPTION

Embodiments of the present invention relate generally to appointment alarms, and more specifically, to the "snooze" feature of appointment alarms, which defers the alarm for a predefined period. Unfortunately, this predefined period may result in a user missing an appointment or event because the alarm's deferral period was too long. The present invention may enhance the snooze feature of appointment alarms by preventing the default deferral period from deferring the alarm to such a point that an appointment has begun or is missed entirely. For example, if a user needs to depart for an appointment by 9:00 AM, and the snooze feature for an alarm would normally delay the alarm such that it activates at 9:05 AM, the present invention could ensure that the snoozed alarm goes off no later than 9:00 AM. The present invention may apply to any sort of alarms, including but not limited to traditional "bedside" alarms clocks, software calendar/scheduler appointment alarms, alarm apps on PDAs, cell phones, tablets, and the like.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
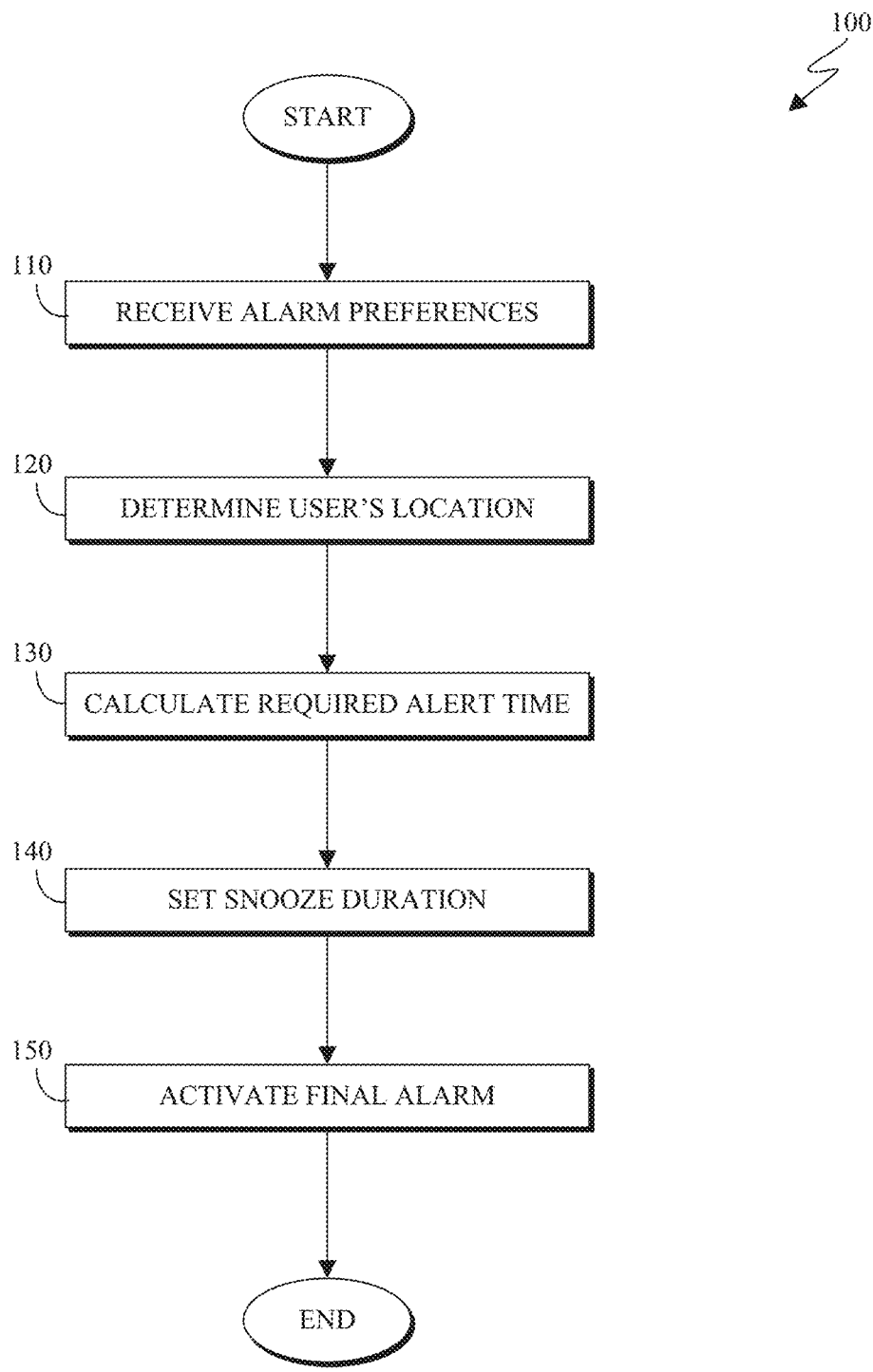
FIG. 1 is a flowchart depicting one embodiment of an alarm activation method in accordance with the present invention.

FIG. 1 is a flowchart depicting one embodiment of an alarm activation method 100 in accordance with the present invention. As depicted, the alarm activation method 100 includes receiving (110) preferences, determining (120) a location, calculating (130) an alert time, setting (140) a deferral duration, and activating (150) an alarm. In some embodiments, the alarm activation method 100 performs some or all of these operations after an initial alarm has occurred and the user has elected to activate the snooze feature of the alarm.

Receiving (110) alarm preferences may include receiving user settings or preferences relating to appointments and appointment alarms. In some embodiments, the settings are particular to a user. For example, a user's morning routine time may be defined as the amount of time it takes the user to wake up, eat breakfast, get ready for work, and depart. Some users may have special considerations that require more or less time to get ready in the morning. For appointments that the user does not specify the alarm preferences, there may be default preferences, e.g., the morning routine time may be one hour by default. The alarm preferences may include other types of preparation times that can variously be enabled or disabled by the user. For example, an office presentation preparation time may provide sufficient time for a user to print documents or to put on a necktie before the scheduled appointment.

Determining (120) a user's location may include determining the geographical location of the user. In some embodiments, the user's location is determined by the alarm device's location as it can be assumed that the user is in close proximity to the alarm device. The alarm device may contain a GPS receiver that enables the location to be determined from satellite signals. In some embodiments, the alarm device may be connected to a network such as the Internet that enables the general location of the alarm device to be estimated. For example, the alarm device's location may be determined from an IP address or by radio or optical triangulation or trilateration. In some embodiments, the user may manually enter a location, e.g., by latitude and longitude or street address. A location determining device may be worn by the user and wirelessly connected to the alarm device (from which the location determining device is physically separate).

Calculating (130) the required alert time may include determining where an appointment is, and how long it will take the user to get to the appointment. In some embodiments, the required alert time is a function of the travel time to the appointment and/or the user's alarm preferences (such as morning routine time and office presentation preparation time). The appointment's location may be determined by user travel history; for example, if the user works in an office, it may be determined that the appointment location is the office's geographical location. In some embodiments, the user may also enter the location of the appointment manually.

The required alert time may be a function of the user's travel time to the appointment, which can be determined by calculating the distance between the user's location and the appointment location, and then estimating how long it will take for the user to travel that distance. In some embodiments, the travel time may made more accurate by the user specifying the user's mode of transportation, whether it is by car, bus, plane, bike, foot, etc., or a combination thereof. The travel time may also be adjusted for upcoming traffic conditions, such as congestion or a lack of congestion where there normally would be. The travel time may be made more accurate by incorporating the user's historical travel data, i.e. how long it takes the user to actually drive to work rather than how long the drive should be.

The required alert time may thus be considered to be the time of the appointment minus the user's travel time and/or the user's preparation time. For example, if the user takes 20 minutes to get ready for an appointment, lives 30 minutes from the appointment location, and the appointment occurs at 12 PM, then the required alert time is 50 minutes prior to the appointment time, or 11:10 AM. The required alert time may therefore serve as the last possible time in which the user must heed the alarm in order to make it to the appointment on time.

Setting (140) the deferral duration may include preventing the default deferral duration from extending the alarm past the required alert time. For example, an alarm may be set at 2 PM for an appointment at 3 PM, and the required alert time may be 2:30 PM. If the alarm interval is 20 minutes, and the user snoozes the first alarm, then the alarm will activate again at 2:20 PM. Snoozing the alarm again would normally mean that the alarm would activate again at 2:40 PM, but this would be too late for the user, as the required alert time is 2:30 PM in this example. Thus, while 20 minutes is the default deferral duration, the second deferral duration would be set to 10 minutes, which enables the user to be alerted at the proper time.

In some embodiments, the deferral duration may be calculated such that it is half of a time measure that is defined as the required alert time minus the current time. In keeping with the previous example, the alarm may be set at 2 PM for an appointment at 3 PM, and the required alert time may be 2:30 PM. As before, the alarm activates at 2 PM and is snoozed for 20 minutes to activate again at 2:20 PM. Here, however, the deferral duration is half of the time span from 2:20 PM to 2:30 PM, which is half of 10 minutes or 5 minutes. If the user snoozes at 2:20, then the next alarm may activate at 2:25. If the user snoozes the 2:25 alarm, then the next deferral duration is 2.5 minutes, or 2:27:30 PM. If the user snoozes the 2:27:30 PM alarm, then the next alarm may activate at 2:27:30+1.25 minutes, which is 2:28:45 PM. Thus, the snoozed alarms may incrementally approach the required alert time, which may have the additional bonus of becoming increasingly annoying to the user, thus increasing the likelihood that the user will heed the alarm.

Activating (150) the final alarm may include determining that deferral duration has elapsed and activating an alarm. In some embodiments, it may not be possible to snooze the final alarm. The importance of the final alarm may be underscored by alerting the user in a manner that is distinct from the normal alarm. For example, an auditory alarm may play a song or alert noise that is different from the normal alarm, or activate a light, cause a vibration, or the like. In some embodiments, the final alarm may be automatically deactivated upon the user's arrival at the appointment, or in the case of an alarm designed to wake the user, any user activity that indicates that the user is roused from slumber. The final alarm may also deactivate when the current time is the time of the appointment, as the alarm may no longer be necessary at this point.

Figure 2:
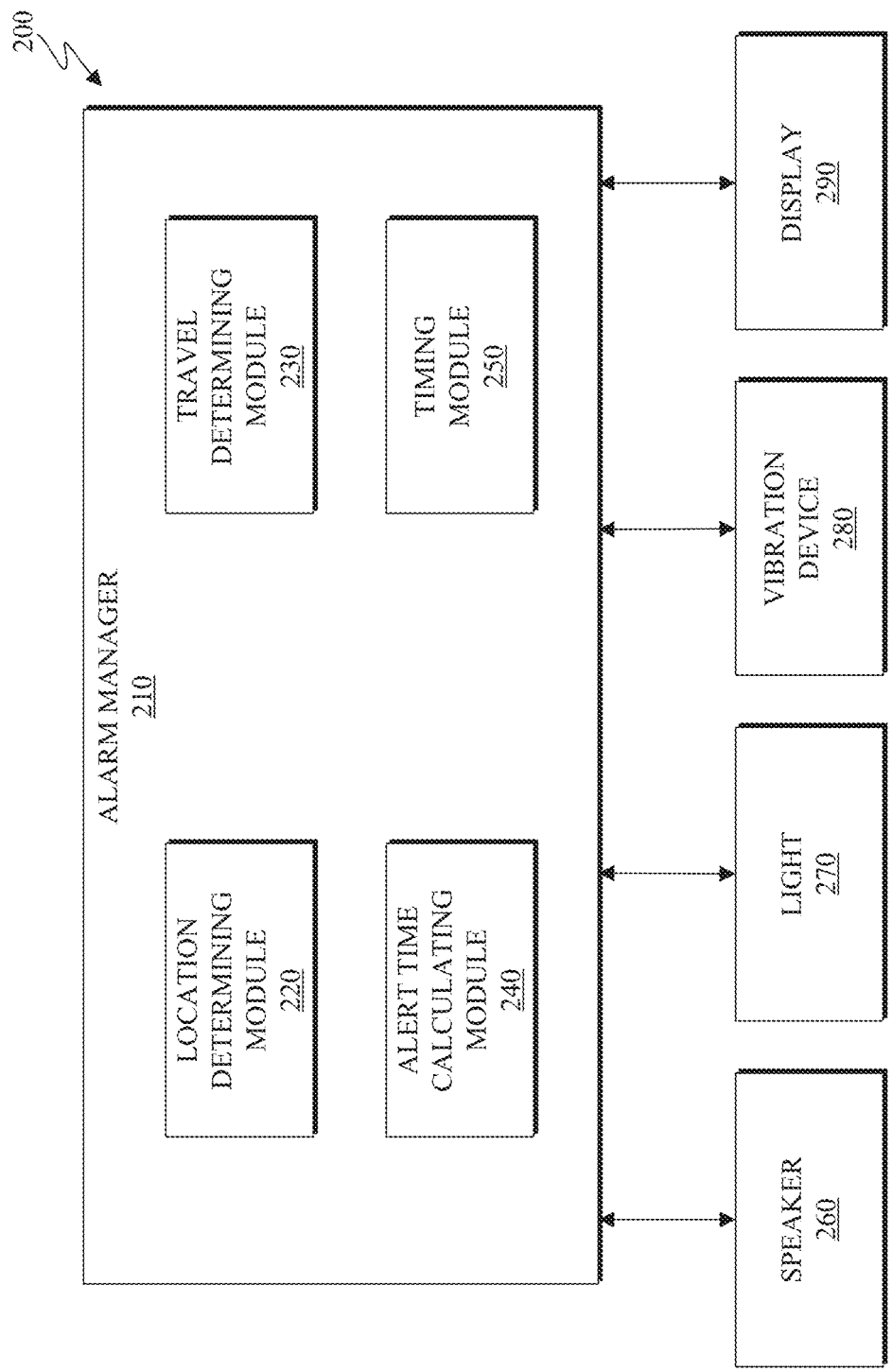
FIG. 2 is a block diagram depicting one embodiment of an alarm apparatus in accordance with the present invention.

FIG. 2 is a block diagram of one embodiment of an alarm apparatus 200 in accordance with the present invention. As depicted, the alarm apparatus 200 includes an alarm manager 210, a location determining module 220, a travel determining module 230, an alert time calculating module 240, a timing module 250, a speaker 260, a light 270, a vibration device 280, and a display 290. The alarm apparatus 200 may be at least a portion of a digital processing apparatus such as a digital appointment alarm, a cell phone, a computer, a laptop, a tablet, or the like.

The alarm manager 210 may be implemented as a software application containing the various alarm modules. The location determining module 220 may include a GPS receiver or other means (as discussed earlier) to determine the location of the alarm or the alarm's user. The travel determining module 230 may determine the rate of travel by calculating how quickly the user or device is changing location using input from the location determining module 220. In some embodiments, the travel determining module 230 estimates travel time based on historical travel time and/or the user's mode of transportation.

The alert time calculating module 240 may determine the timing of the alarm's various alerts, including the default deferral duration and any of the modified deferral durations (as described above) coming from the various operations of the alarm activation method 100. The timing module 250 may include a digital, analog, or virtual chronometer that is used to track all of the various timings involved with embodiments of the present invention.

The speaker 260 may be any device which is capable of producing a sound, such as an electroacoustic transducer. Speakers 260 may include PC speakers, tweeters, loudspeakers, woofers, or the like. The light 270 may be any device which is capable of emitting photons, such as an LED, incandescent light, fluorescent light, or the like. The vibration device 280 may be any device that produces vibrations detectable by the user, and may also provide haptic feedback to the user.

The display 290 may include any sort of visual display, such as LED, LCD, CRT, or the like. The display 290 may be haptically interactive, such as in the case of touchscreens. In some embodiments, the display 290 enables the user to view and/or interact with an alarm's graphical user display. As depicted, the speaker 260, light 270, vibration device 280, and/or display 290 are not incorporated into the alarm manager 210 portion of the alarm apparatus 200, but in some embodiments, some or all of these elements may be included in the alarm manager 210.

Figure 3:
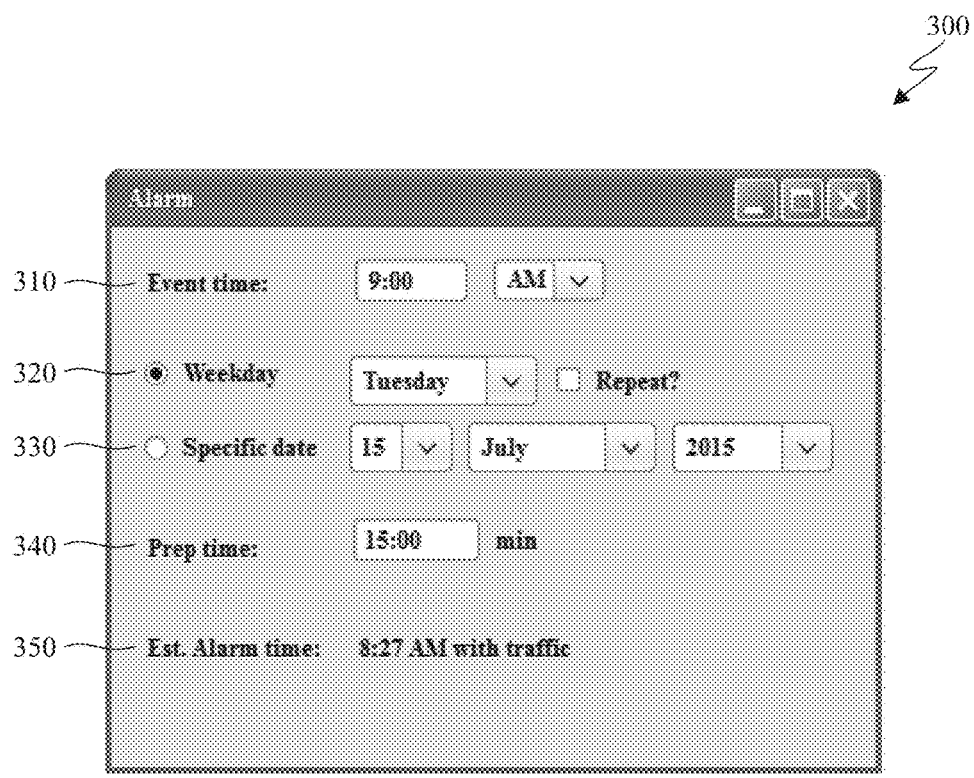
FIG. 3 is a user interface diagram depicting one embodiment of an alarm interface in accordance with the present invention.

FIG. 3 is an alarm interface 300 of one embodiment in accordance with the present invention. As depicted, the alarm interface 300 includes an appointment time field 310, a weekday field 320, a date field 330, a preparation time field 340, and a final alarm indicator 350. The alarm interface 300 may enable a user to configure the user preferences for the alarm, and thus may relate to settings included in the preferences receiving operation 110. The alarm interface 300 may be displayed on a computer, tablet, cell phone, PDA, or the like.

The time field 310 may display the time for an appointment and/or enable a user to set a time for an appointment. In some embodiments, the time field 310 may be automatically set depending on the appointment, with the user being able to alter it if necessary. The weekday field 320 may be used for an appointment happening on a particular day of the week. In the depicted embodiment, the radio button of the weekday field 320 is selected, indicating that the alarm will go off on a Tuesday. The weekday field 320 may also have an option to repeat the alarm for recurring appointments. Alternatively, the date field 330 may enable a user to specify a particular calendar date for the appointment.

The preparation time field 340 may enable a user to specify the user's desired amount of preparation time for the appointment. In some embodiments, a default preparation time is provided that is alterable by the user. The preparation time may be determined from the user's historical data as previously discussed. As one example, the user may usually require 15 minutes to prepare for an appointment, but the user may alter the preparation time using the preparation time field 340 to 30 minutes if the user is aware of a new preparatory task that will delay the user by 15 minutes more than usual.

The final alarm indicator 350 may indicate when the final alarm will activate. In some embodiments, the final alarm indicator 350 may update on-the-fly depending on changing travel conditions, such as road congestion or flight delays. The final alarm indicator 350 may also include user preferences regarding the nature of the final alarm, enabling the user to select a mode of alerting the user that is distinct from the normal alarm.

Figure 4:
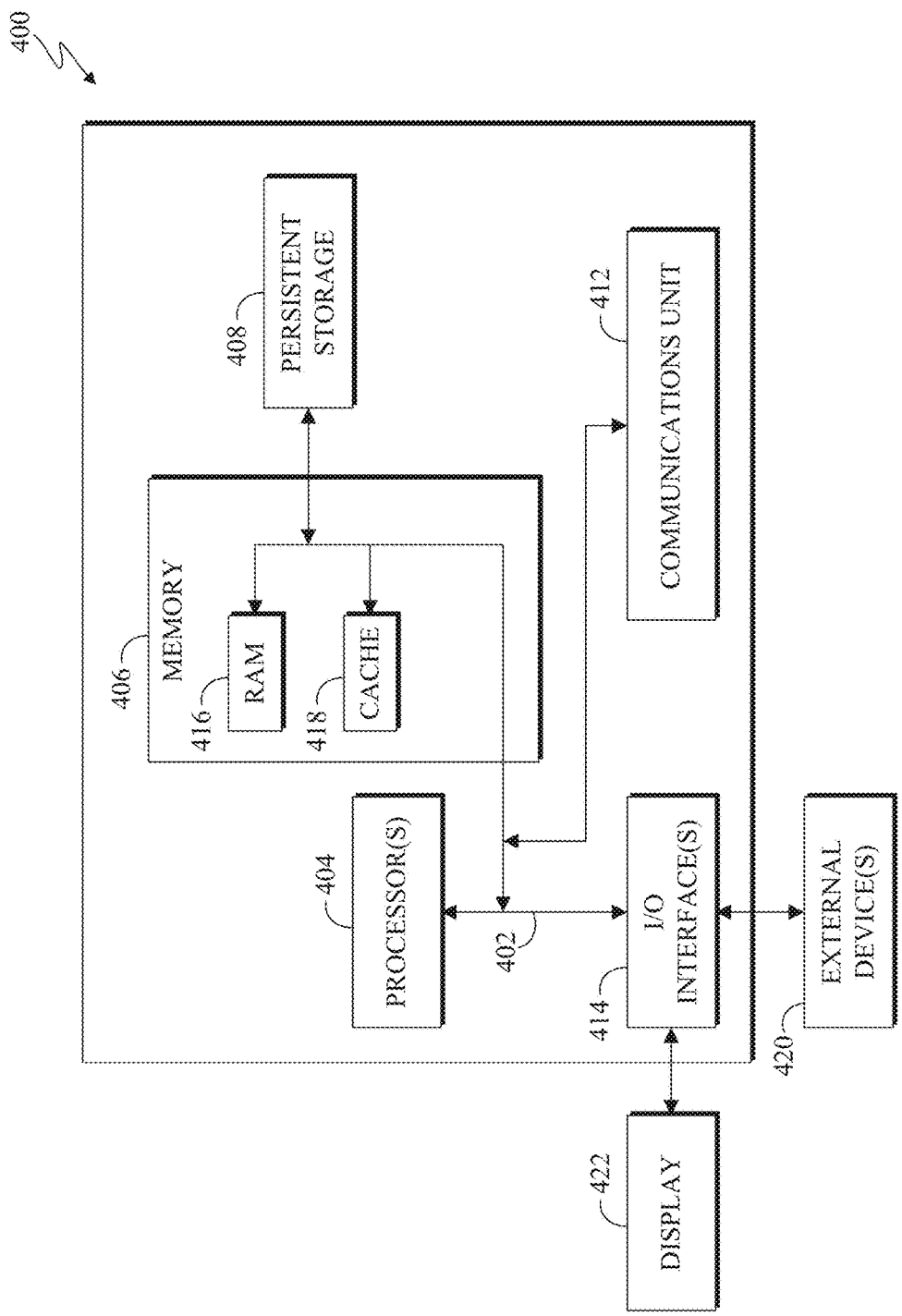
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. The computer 400 may be at least a portion of the alarm apparatus 200 depicted in FIG. 2. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between one or more digital processing apparatus (e.g. computer processor(s) 404), memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for deferring an alarm, the method comprising:
   determining a travel duration, wherein the travel duration comprises a distance between a user's location and an appointment location divided by a rate of travel for the user;
   calculating a required alert time, wherein the required alert time comprises a meeting time less the travel duration; and
   responsive to receiving an alarm deferral from a user that defers an alarm past the required alert time, setting a deferred alarm to no later than the required alert time.

2. The method of claim 1, further comprising activating a final alarm when the deferral duration has elapsed.

3. The method of claim 1, further comprising deactivating the alarm when the appointment occurs.

4. The method of claim 1, further comprising deactivating the alarm when the user arrives at the appointment location.

5. The method of claim 1, wherein the rate of travel for the user is determined based on a mode of transportation for the user.

6. The method of claim 1, wherein the required alert time further comprises the meeting time less the travel duration and less an amount of time the user requires to prepare for the appointment or for departure to the appointment location.

7. An apparatus comprising:
a digital processing apparatus;
one or more storage media readable by the digital processing apparatus;
program instructions stored therein for execution by the digital processing apparatus, the program instructions comprising instructions to:
determine a travel duration, wherein the travel duration comprises a distance between a user's location and an appointment location divided by a rate of travel for the user;
calculate a required alert time, wherein the required alert time comprises a meeting time less the travel duration; and
responsive to receiving an alarm deferral from a user that defers an alarm past the required alert time, set a deferred alarm to no later than the required alert time.

8. The apparatus of claim 7, further comprising instructions to activate a final alarm when the deferral duration has elapsed.

9. The apparatus of claim 7, further comprising instructions to deactivate the alarm when the appointment occurs.

10. The apparatus of claim 7, further comprising instructions to deactivate the alarm when the user arrives at a location of the appointment location.

11. The apparatus of claim 7, wherein the rate of travel for the user is determined based on a mode of transportation for the user.

12. The apparatus of claim 7, wherein the required alert time further comprises the meeting time less the travel duration and less an amount of time the user requires to prepare for the appointment or for departure to the appointment.

13. A computer program product for deferring an alarm, the computer program product comprising:
a computer readable storage medium and program instructions stored on the computer readable storage medium, the program instructions comprising instructions to:
determine a travel duration, wherein the travel duration comprises a distance between a user's location and an appointment location divided by a rate of travel for the user;
calculate a required alert time, wherein the required alert time comprises a meeting time less the travel duration; and
responsive to receiving an alarm deferral from a user that defers an alarm past the required alert time, set a deferred alarm to no later than the required alert time.

14. The computer program product of claim 13, further comprising instructions to activate a final alarm when the deferral duration has elapsed.

15. The computer program product of claim 13, further comprising instructions to deactivate the alarm when the appointment occurs.

16. The computer program product of claim 13, further comprising instructions to deactivate the alarm when the user arrives at a location of the appointment location.

17. The computer program product of claim 13, wherein the required alert time further comprises the meeting time less the travel duration and less an amount of time the user requires to prepare for the appointment or for departure to the appointment.

* * * * *